(12) United States Patent
Ishii

(10) Patent No.: US 12,072,214 B2
(45) Date of Patent: Aug. 27, 2024

(54) DISPLACEMENT AMOUNT DETECTION APPARATUS, DISPLACEMENT AMOUNT DETECTION METHOD, AND MANIPULATION INFORMATION OUTPUT APPARATUS

(71) Applicant: YAMAHA CORPORATION, Hamamatsu (JP)

(72) Inventor: Jun Ishii, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 406 days.

(21) Appl. No.: 17/402,825

(22) Filed: Aug. 16, 2021

(65) Prior Publication Data

US 2022/0057236 A1 Feb. 24, 2022

(30) Foreign Application Priority Data

Aug. 20, 2020 (JP) .................................. 2020-139332

(51) Int. Cl.
*G01D 5/20* (2006.01)
*G10H 1/34* (2006.01)
*H02M 7/04* (2006.01)

(52) U.S. Cl.
CPC ............ *G01D 5/2066* (2013.01); *H02M 7/04* (2013.01); *G10H 1/344* (2013.01); *G10H 2220/221* (2013.01); *G10H 2220/275* (2013.01)

(58) Field of Classification Search
CPC ........ G10H 1/34; G10H 1/344; G10H 1/0008; G10H 1/0555; G10H 1/346; G10H 1/182;
(Continued)

(56) References Cited

U.S. PATENT DOCUMENTS 4,838,139 A * 6/1989 Fiori, Jr. ................ G10H 1/182
341/32
2020/0320966 A1* 10/2020 Clark ..................... G10H 1/344
(Continued)

FOREIGN PATENT DOCUMENTS

GB 2573644 A 11/2019
GB 2580541 B 11/2021
(Continued)

OTHER PUBLICATIONS

Equivalent circuit, Glossary of Motor Terms, Nidec Corporation, obtained from https://www.nidec.com/en-US/technology/motor/glossary/item/equivalent_circuit/, obtained on Nov. 9, 2023. (Year: 2023).*

(Continued)

*Primary Examiner* — David M Schindler
(74) *Attorney, Agent, or Firm* — ROSSI, KIMMS & McDOWELL LLP

(57) ABSTRACT

An apparatus includes a first resonant circuit including a first coil mounted to a movable member; a second resonant circuit including a second coil facing the first coil and generating a magnetic field upon supply of an electric current and outputs a detection signal of a voltage level depending on a relative position of the second coil to a position of the first coil; and a first equivalent circuit equivalent to the second resonant circuit in a case where a distance between the first and second coils is infinite and a second equivalent circuit equivalent to the second resonant circuit in a case where the distance is zero. A processor corrects the detection signal based on an output signal output from the first equivalent circuit and an output signal output from the second equivalent circuit, and calculates, based on the corrected detection signal, a displacement amount of the movable member.

7 Claims, 9 Drawing Sheets

(58) Field of Classification Search
CPC ....... G10H 2220/221; G10H 2220/275; G01B 7/14; G01B 7/003; G01D 5/202; G01D 5/2033; G01D 5/2026; G01D 5/204; G01D 5/2086; G01D 5/2073; G01D 5/2053; G01D 5/206; G01D 5/2066; G01D 5/225; G01R 33/0023; G01R 33/0029; G01R 33/0035; G01R 33/0041; H03K 17/972; H03M 1/12; H02M 7/04; G01H 1/34; G01H 1/344; G01H 1/0008; G01H 1/0555; G01H 1/346; G01H 1/182
See application file for complete search history.

(56) References Cited

U.S. PATENT DOCUMENTS

| 2021/0151020 A1* | 5/2021 | Tanoue | G10H 1/346 |
| 2023/0013774 A1* | 1/2023 | Ishii | G01B 7/14 |

FOREIGN PATENT DOCUMENTS

| JP | 2004085215 A | 3/2004 |
| JP | 2005195618 A | 7/2005 |
| WO | 8705732 A1 | 9/1987 |
| WO | 2019122867 A1 | 6/2019 |

OTHER PUBLICATIONS

Extended European Search Report issued in European Appln. No. 21191052.6 mailed Jan. 14, 2022.
Extended European Search Report issued in European Appln. No. 23182851.8, mailed Nov. 16, 2023.
Office Action issued in Japanese Appln. No. 2020-139332, mailed Nov. 28, 2023. English machine translation provided.
Office Action issued in Chinese Appln. No. 202110927294.2, mailed Mar. 5, 2024. English machine translation provided.

* cited by examiner

DISPLACEMENT AMOUNT DETECTION APPARATUS, DISPLACEMENT AMOUNT DETECTION METHOD, AND MANIPULATION INFORMATION OUTPUT APPARATUS

CROSS-REFERENCE TO RELATED APPLICATION

This application is based on and claims priority from Japanese Patent Application No. 2020-139332, filed on Aug. 20, 2020, the entire contents of which are incorporated herein by reference.

BACKGROUND

Technical Field

The present disclosure relates to a displacement amount detection apparatus, a displacement amount detection method, and an apparatus for outputting manipulation information.

Background Information

There have been proposed in the art various techniques for detecting an amount of displacement of a movable member (manipulator). For example, in a case that the movable member is a key of a musical keyboard instrument, there has been proposed a technique in which an optical element (e.g., a grayscale) is provided an amount of transmission of which varies depending on an amount of displacement of the key, so that a sensor measures the amount of transmission to obtain information such as an amount of depression of the key (e.g., Japanese Patent Application Laid-Open Publication No. 2005-195618 (hereafter, JP 2005-195618)).

The technology described in JP 2005-195618 requires use of delicate optical elements, such as grayscale, which are sensitive to shock, vibration, and contamination, thus making it difficult to attain long-term reliability.

SUMMARY

In view of these circumstances, one object of the present disclosure is to provide an apparatus and a method for displacement amount detection, etc., which remain reliable over a long term.

In one aspect, the present disclosure provides a displacement amount detection apparatus that includes (i) a first resonant circuit that includes a first coil mounted to a movable member; (ii) a second resonant circuit that includes a second coil that generates a magnetic field upon supply of an electric current and is configured to output a detection signal of a voltage level depending on a relative position of the second coil with respect to a position of the first coil, the second coil facing the first coil; and (iii) a pair of first and second equivalent circuits. The first equivalent circuit is equivalent to the second resonant circuit in a case where the second resonant circuit is in a state in which a distance between the first coil and the second coil is infinite; and the second equivalent circuit is equivalent to the second resonant circuit in a case where the second resonant circuit is in a state in which the distance between the first coil and the second coil is zero. The displacement amount detection apparatus further includes a processor configured to: acquire a first output signal output from the first equivalent circuit when the electric current is supplied to the first equivalent circuit; acquire a second output signal output from the second equivalent circuit when the electric current is supplied to the second equivalent circuit; correct the detection signal based on the first output signal and the second output signal; and calculate, based on the corrected detection signal, a displacement amount of the movable member.

DETAILED DESCRIPTION

In the following, description is given of a musical keyboard instrument to which a displacement amount detection apparatus according to an embodiment of the present disclosure is applied. A musical keyboard instrument has a plurality of keys (e.g., 88 keys), including, for example, black keys and white keys. The musical keyboard instrument detects an amount of displacement and a velocity of each key, and outputs manipulation information for each key based on the amount of displacement and velocity.

Figure 1:
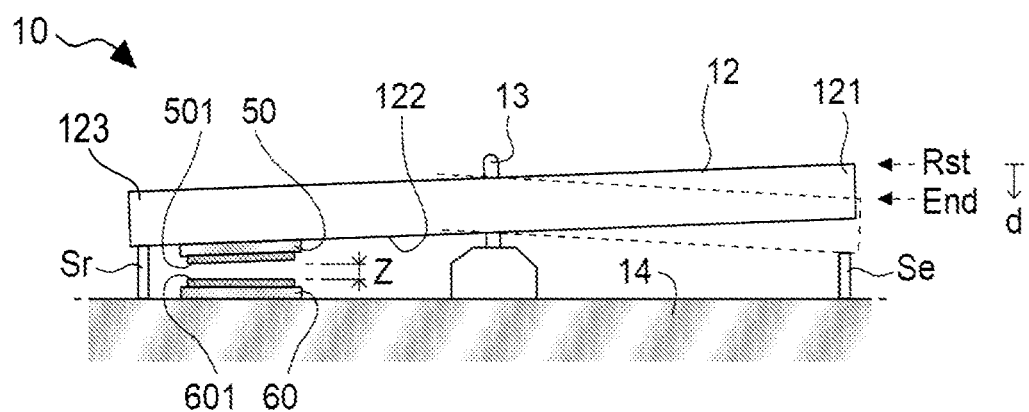
FIG. 1 shows a configuration of a musical keyboard instrument that includes a displacement amount detection apparatus according to an embodiment.

FIG. 1 shows an example of a configuration of a keyboard of a musical keyboard instrument 10. Each of a plurality of keys 12 of the keyboard is swingably supported by a support member 14 by way of a fulcrum 13. Each key 12 has a first end 121 at one end and a second end 123 at the other end in its longitudinal direction. The first end 121 of each key 12 is displaced in the vertical direction shown in the figure in response to manipulation of the key 12 by a user. The support member 14 is a fixed structure that supports various elements of the keyboard. The key 12 is urged in a counterclockwise direction about the fulcrum 13 shown in the figure, under elasticity of a spring or the like (not shown). When the key 12 is not manipulated by the user, as depicted by the solid line, the key 12 is held at a rest position Rst, and is stopped by a stopper Sr. When the key 12 is depressed by the user, as depicted by the dashed line, the key 12 is displaced as far as a down end position End and stopped by a stopper Se.

On the underside surface 122 of each key 12, there is provided a first resonant circuit 50 close to the second end 123 of each key 12. The first resonant circuit 50 includes a first planar coil 501. A second resonant circuit 60 is mounted to the support member 14. The second resonant circuit 60 includes a second planar coil 601. The first resonant circuit 50 and the second resonant circuit 60 are arranged such that the first coil 501 and the second coil 601 face each other. The first resonant circuit 50 and the second resonant circuit 60 constitute a detection circuit (described later). Although in FIG. 1, a white key is illustrated as an example of a key 12, a pair of the first and second resonant circuits 50 and 60 is mounted in the same manner for a black key.

A displacement amount of a key 12 is assumed to be a variable "d" when the first end 121 of the key 12 is displaced from the rest position Rst as the start point to the end position End as the end point. The distance between the center of the first planar coil 501 and the center of the second planar coil 601 is assumed to be Z. As the displacement amount d increases, the distance Z also increases. The displacement amount d can be of a value within a range from a minimum value of zero at the rest position Rst to a finite value at the down end position End. The distance Z can be of a value within a range from a value (Zrst) corresponding to the rest position Rst to a value (Zend) corresponding to the down end position End. Alternatively, the first resonant circuit 50 and the second resonant circuit 60 may be mounted closer to the first end 121 than the fulcrum 13. When mounted in such a manner, the distance Z decreases as the displacement amount d increases.

Figure 2:
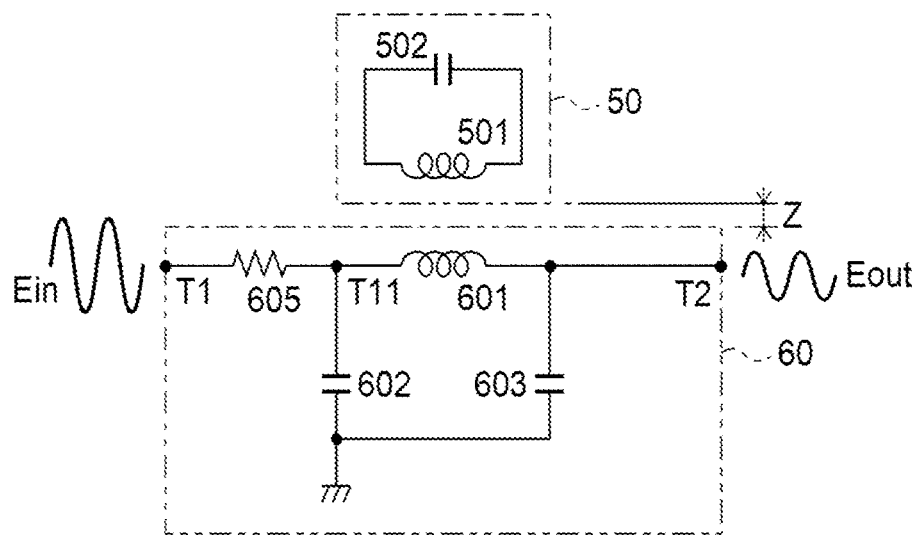
FIG. 2 is a diagram showing a detection circuit with a first resonant circuit and a second resonant circuit in a musical keyboard instrument.

FIG. 2 shows a detection circuit with the first resonant circuit 50 and the second resonant circuit 60. The first resonant circuit 50 includes a first coil 501 and a capacitor 502. In the first resonant circuit 50, the two ends of the first coil 501 are coupled with the two ends of the capacitor 502, to form a resonant circuit with the first coil 501 and the capacitor 502. In the present embodiment, it is assumed that the first resonant circuit 50 is set to a resonant frequency fp. The first coil 501 is formed, for example, of spiraled copper foil provided on the surface of an insulation substrate. The capacitor 502 may be a chip capacitor, for example.

The second resonant circuit 60 includes an input terminal T1, an output terminal T2, a second coil 601, capacitors 602 and 603, and a resistor 605, among which the second coil 601, the capacitors 602 and 603, and the resistor 605 constitute a resonant circuit. The input terminal T1 is coupled to one end (first end) of the resistor 605. The other end (second end) of the resistor 605 is coupled to one end (first end) of the second coil 601 and one end (first end) of the capacitor 602. The other end (second end) of the second coil 601 is coupled to one end (first end) of the capacitor 603. The node between the first end of the second coil 601, the first end of the capacitor 602, and the second end of the resistor 605 is denoted as a node T11. The second end of the second coil 601 and the first end of the capacitor 603 are coupled to the output terminal T2. The other end (second end) of the capacitor 602 and the second end of the capacitor 603 are grounded to a potential Gnd, which is a zero voltage reference. The second coil 601 is formed, for example, of a spiraled copper foil provided on the surface of an insulation substrate. The capacitors 602 and 603 may each be a chip capacitor, for example, and the resistor 605 may be a chip resistor, for example.

The resonant frequency fa in the second resonant circuit 60 is set according to expected characteristics in relation to the resonant frequency fp of the first resonant circuit 50, in relation to a measurement frequency fm (described later), or the like. In the present embodiment, the resonant frequency fa in the second resonant circuit 60 is set to have a relationship of $1/(\sqrt{2})$ times the measurement frequency fm. The resonant frequency fa of the second resonant circuit 60 may be, for example, approximately equal to the resonant frequency fp of the first resonant circuit 50, or may be a value obtained by multiplying the resonant frequency fp by a predetermined constant.

When an AC reference signal Ein is supplied to the input terminal T1, a magnetic field corresponding to the reference signal Ein is generated in the second coil 601. An induced current is generated in the first coil 501 due to the electromagnetic induction of the magnetic field generated in the second coil 601. The magnetic field generated in the first coil 501 changes in accordance with the distance Z between the first coil 501 and the second coil 601, and affects the impedance in the second coil 601. Specifically, the impedance is large in the second coil 601 when the distance Z is small, while the impedance is small when the distance Z is large.

Consequently, the level of the detection signal Eout output from the output terminal T2 varies depending on the distance Z. The detection signal Eout is a periodic signal a level of which changes in the same cycle as does the reference signal Ein. In the present embodiment, the level of the detection signal Eout may be the voltage level of a signal Edc obtained by rectifying and smoothing the detection signal Eout. The level of the detection signal Eout may be peak-to-peak in a non-rectified state, or may be a peak amplitude, which is a magnitude from zero to a maximum value or a minimum value. The frequency of the AC reference signal Ein is set to the resonant frequency in the first or second resonant circuit 50 or 60, or is set to be within the vicinity of the resonant frequency in the first or second resonant circuit 50 or 60 (for example, a deviation of ±150 kHz is acceptable). The frequency of the reference signal Ein is referred to as a measurement frequency fm. In the present embodiment, the measurement frequency fm is set to have the same frequency as the resonant frequency fp of the first resonant circuit 50. An AC signal with a superimposed DC component is used as the reference signal Ein.

Figure 3:
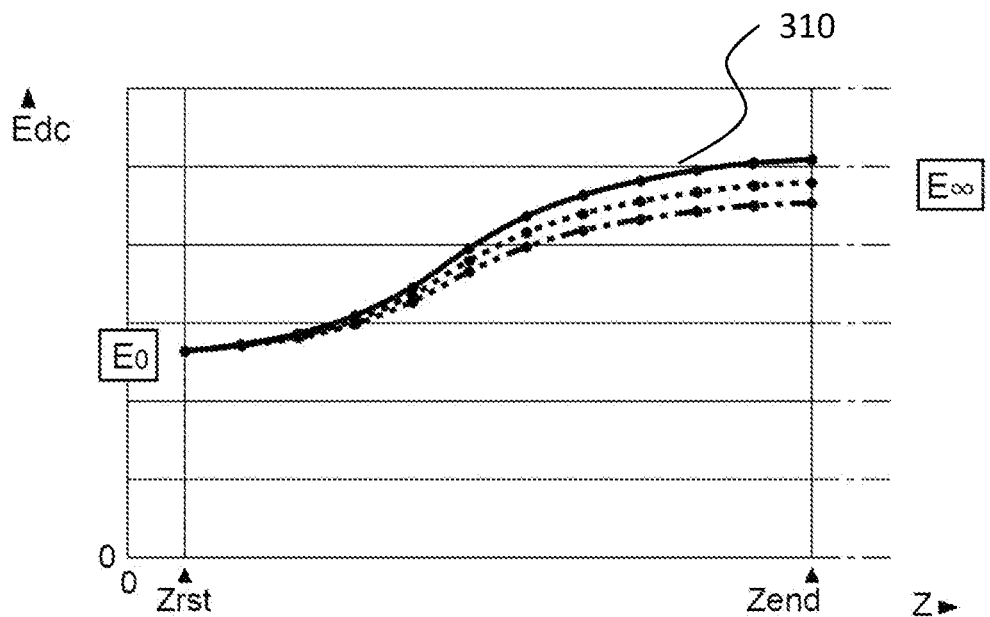
FIG. 3 shows examples of output characteristics of a detection signal.

FIG. 3 shows example characteristics of the voltage levels 310 of the signal Edc in relation to the distance Z. The voltage level 310 of the signal Edc changes almost nonlinearly over an entire range from the distance Zrst corresponding to the rest position Rst, to the distance Zend corresponding to the down end position End. Due to nonlinearity, variations in the detected voltage levels 310 occur over time or as a result of unevenness in the capacitances 602 and 603, even in the second resonant circuit 60 of the same key 12. In particular, variations in the detected voltage levels 310 tend to increase within a range within which the voltage level of the signal Edc is high or the distance Z is large. There are different causes for such variations, including changes in circuit characteristics resulting from heat generation caused by energization, aging, and other factors.

Figure 4:
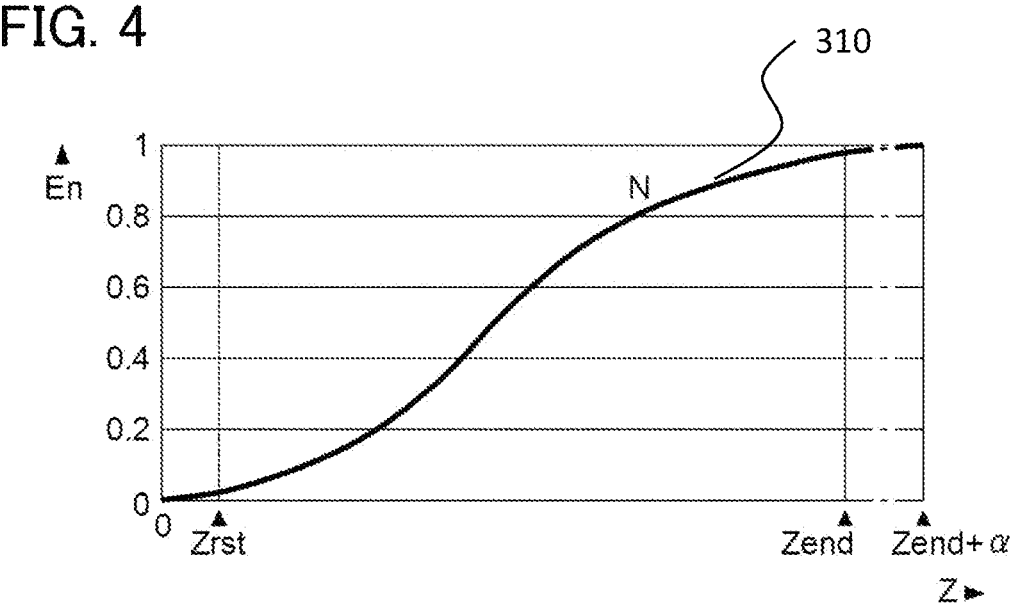
FIG. 4 shows an example of output characteristics of a normalized detection signal.

To reduce the variations, the nonlinear characteristics shown in FIG. 3 can be normalized as shown in FIG. 4, and the distance Z can be calculated from a voltage level En using the normalized nonlinear characteristics N. The voltage level En can be obtained from the following Equation (1).

$$En=(Edc-E_0)/(E_\infty-E_0) \quad (1)$$

In Equation (1), $E_0$ is the voltage level 310 of the detection signal Eout when the distance Z is zero, and $E_\infty$, is the voltage level 310 of the detection signal Eout when the distance Z is infinite. As a result of such normalization, it should be possible to accurately determine, from the voltage level En (Edc), the distance Z (and in turn the displacement amount d corresponding to the determined distance Z), which is less affected by the variations.

However, with the first resonant circuit 50 mounted to the key 12 and the second resonant circuit 60 mounted to the support member 14, physically the distance Z can neither be zero nor infinite. Accordingly, neither the voltage levels $E_0$ nor $E_\infty$, can be obtained with the first and second resonant circuits 50 and 60 mounted to the musical keyboard instrument 10. Thus, normalization cannot be readily achieved in a case that the circuit characteristics change due to factors such as heat generation caused by energization, aging, and so forth.

Accordingly, in the present embodiment, two equivalent circuits are provided: a first equivalent circuit 70 that simulates the circuit characteristics of the second resonant circuit 600 when the distance Z is infinite; and a second equivalent circuit 80 that simulates the circuit characteristics of the second resonant circuit 600 when the distance Z is zero. In the present embodiment, the first equivalent circuit 70 is used to obtain the voltage level $E_\infty$, the second equivalent circuit 80 is used to obtain the voltage level $E_0$, and the nonlinear characteristics are normalized using the obtained voltage levels $E_\infty$, and $E_0$. Both the first equivalent circuit 70 and the second equivalent circuit 80, details of which will be described later, have an input terminal T1 and an output terminal T2, as in the second resonant circuit 60.

Due to their nonlinearity, the normalized characteristics N are extremely difficult to use as they are. Accordingly, in the present embodiment, the distance Z (displacement amount d) is obtained by applying to the nonlinear characteristics N their inverse functions. The inverse functions are indicative of characteristics obtained by inverting the characteristics N with respect to a straight line connecting, for example, the voltage level En (=0) when the distance Z is zero and the voltage level En (=1) when the distance Z is infinite.

Furthermore, among a range of the voltage level En (=0) when the distance Z is zero to the voltage level En (=1) when the distance Z is infinite, in the present embodiment there is used, for example, a range of the distance Zrst corresponding to the rest position Rst to the distance Zend corresponding to the down end position End. In a range where the distance Z is large as shown in FIG. 3, the voltage level of the signal Edc is close to maximum and scarcely increases. Accordingly, a position at the infinite distance Z is defined as corresponding to the distance (Zend+α), with the distance Zend corresponding to the down end position End of the key 12 and the distance a corresponding to a margin.

The distance Zrst may be linked to the voltage level En of the signal Edc detected in a state where the key 12 is not manipulated by the user, such as immediately after the instrument is turned on. Furthermore, among different distances Z measured during a period in which the key 12 is manipulated by the user, the minimum value may be used as the distance Zrst, and the maximum value may be used as the distance Zend at the down end position End. The distances Zrst and Zend are obtained for each of the 88 keys and are stored in a storage device. It is of note that the distances Zrst and Zend may be updated periodically or as needed to reflect variations in circuit characteristics during playing. Correcting the start point of the characteristics N to a position at the distance Zrst of a certain key 12 and correcting the end point of the characteristics N to a position at the distance Zend of the key 12 is herein referred to as "Rest-End correction."

Thus, according to the present embodiment, the characteristics shown in FIG. 3 are normalized to the characteristics N as shown in FIG. 4 by use of Equation (1), and the Rest-End correction is further performed with use of the distances Zrst and Zend. Accordingly, the variations in the circuit characteristics due to heat generation, aging, etc., can be reduced, and with circuit characteristics having fewer variations, it is possible to obtain the distance Z, and the displacement amount d depending on the distance Z. In the present embodiment, the musical keyboard instrument 10 has 88 pairs of the first and second resonant circuits 50 and 60 for the respective 88 keys, and the 88 pairs are divided into 11 groups. A pair of the voltage levels $E_\infty$, and $E_0$ is used in common for normalization of eight pairs of the first and second resonant circuits 50 and 60 in the same group.

Described above is an overview of determining the distance Z (displacement amount d) from the voltage level En of the signal Edc in the musical keyboard instrument 10 of the present embodiment. In the musical keyboard instrument 10, the displacement amounts d of the 88 keys 12 are determined in time division. The configuration of the instrument in such a case will be explained below.

Figure 5:
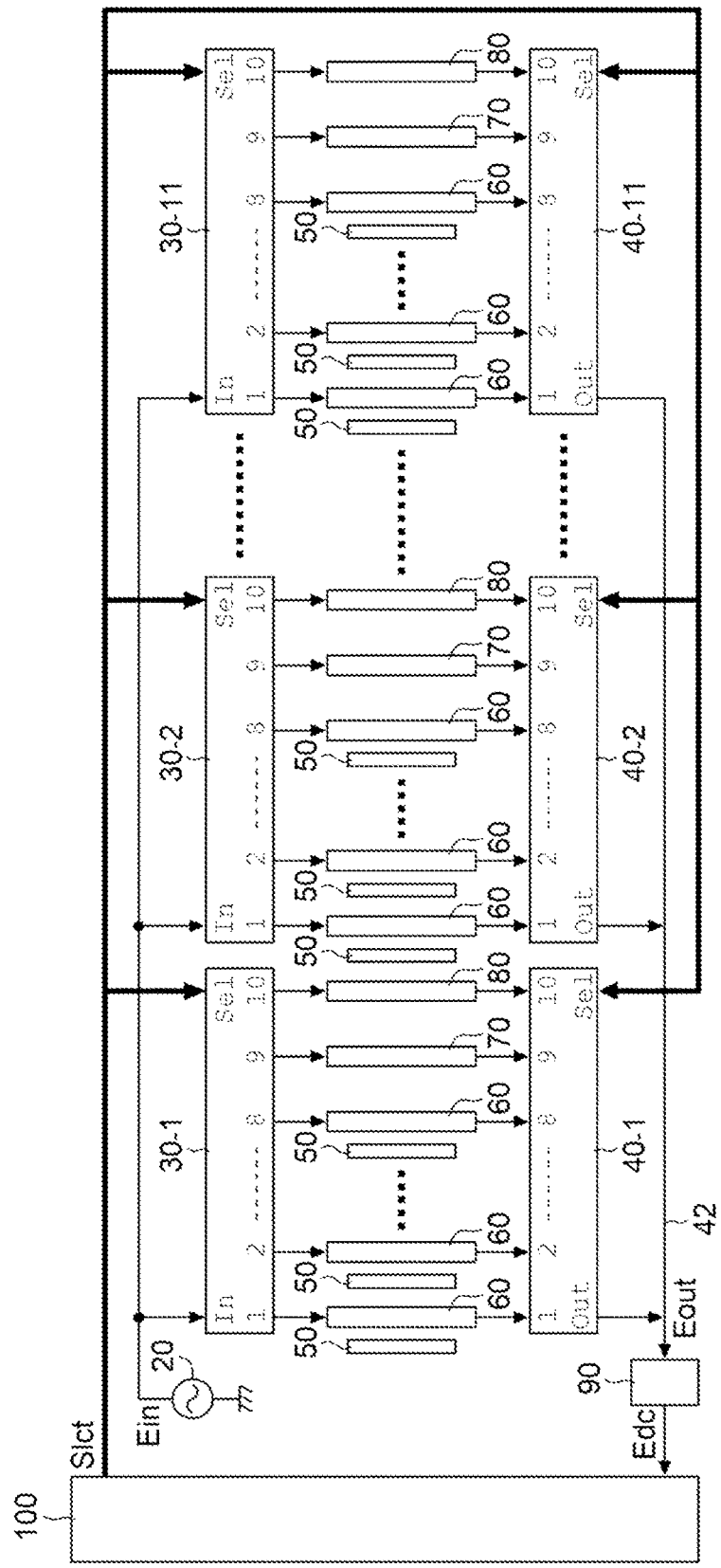
FIG. 5 is a block diagram of an entire circuit including a detection circuit in the musical keyboard instrument.

FIG. 5 shows a block diagram of a complete circuit of the musical keyboard instrument 10, including the detection circuit. The musical keyboard instrument 10 includes an information processor 100, an oscillator 20, a set of demultiplexers 30_1 to 30_11, a set of multiplexers 40_1 to 40_11 (i.e., 11 pairs of a demultiplexer 30 and a multiplexer 40), 88 pairs of the first and second resonant circuits 50 and 60, 11 pairs of the first and second equivalent circuits 70 and 80, and a rectifier-smoothing circuit 90. The oscillator 20 outputs the reference signal Ein as described above. In this circuit, the resonant frequency fa of the second resonant circuit 60 is set to a value of 1/(√2) times the measurement frequency fm. The measurement frequency fm has the same value as that of the resonant frequency fp of the first resonant circuit 50.

The information processor 100 outputs a control signal Slct to the demultiplexers 30_1 to 30_11 and the multiplexers 40_1 to 40_11. The information processor 100 obtains the displacement amount d for each of the 88 keys 12 based on the signal Edc.

Each of the demultiplexers 30_1 to 30_11 is paired with one of the multiplexers 40_1 to 40_11 having a same number after the underscore symbol (_). For example, the demultiplexer 30_2 and multiplexer 40_2 are paired, and the demultiplexer 30_11 and multiplexer 40_11 are paired. The control signal Slct specifies one of the 11 pairs of demultiplexers 30_1 to 30_11 and multiplexers 40_1 to 40_11, specifies the selection of one of the outputs 1 to 10 of the demultiplexer in the specified pair, and specifies the selection of one of the inputs 1 to 10 in the multiplexer of the specified pair.

Of the demultiplexers 30_1 to 30_11, the demultiplexer specified by the control signal Slct outputs the reference signal Ein supplied to the input In to one of the outputs 1 to 10 specified by the control signal Slct. It is of note that among the demultiplexers 30_1 to 30_11, those that are not specified by the control signal Slct do not output the reference signal Ein to any of the outputs 1 to 10. Of the multiplexers 40_1 to 40_11, the multiplexer specified by the control signal Slct outputs a signal that is input at one of the inputs 1 to 10 specified by the control signal Slct through the output Out to the path 42. Among the multiplexers 40_1 to 40_11, those that are not specified by the control signal Slct disconnect the outputs Out from the path 42.

Hereafter, the demultiplexers 30_1 to 30_11 and the multiplexers 40_1 to 40_11 will simply be referred to as the demultiplexer 30 and the multiplexer 40 in general descriptions without distinguishing between pairs; thus, suffix numbers will be omitted. Furthermore, the outputs 1-10 of the demultiplexer 30 and the inputs 1-10 of the multiplexer 40 have a one-to-one correspondence with each other, respectively, and thus the outputs 1 to 10 and the inputs 1 to 10 may on occasion simply be referred to as inputs/outputs 1-10.

Of the inputs/outputs 1-10 of the demultiplexer 30 and multiplexer 40, assigned to the inputs/outputs 1-8 are eight second resonant circuits 60; assigned to the input/output 9 is one first equivalent circuit 70; and assigned to the input/output 10 is one second equivalent circuit 80. In other words, a pair of the first and second equivalent circuits 70 and 80 is assigned for a set of eight second resonant circuits 60.

The input terminals T1 of the eight second resonant circuits 60 are coupled one-to-one with corresponding outputs 1-8 of the demultiplexer 30; the input terminal T1 of the first equivalent circuit 70 is coupled to the output 9; and the input terminal T1 of the second equivalent circuit 80 is coupled to the output 10. Similarly, the output terminals T2 of the eight second resonant circuits 60 are coupled one-to-one with corresponding inputs 1-8 of the multiplexer 40; the output terminal T2 of the first equivalent circuit 70 is coupled to the input 9; and the output terminal T2 of the second equivalent circuit 80 is coupled to the output 10.

The rectifier-smoothing circuit 90 rectifies and smooths the signal that has been output to the path 42, and outputs a resultant signal as the signal Edc, for input to the information processor 100.

Figure 6:
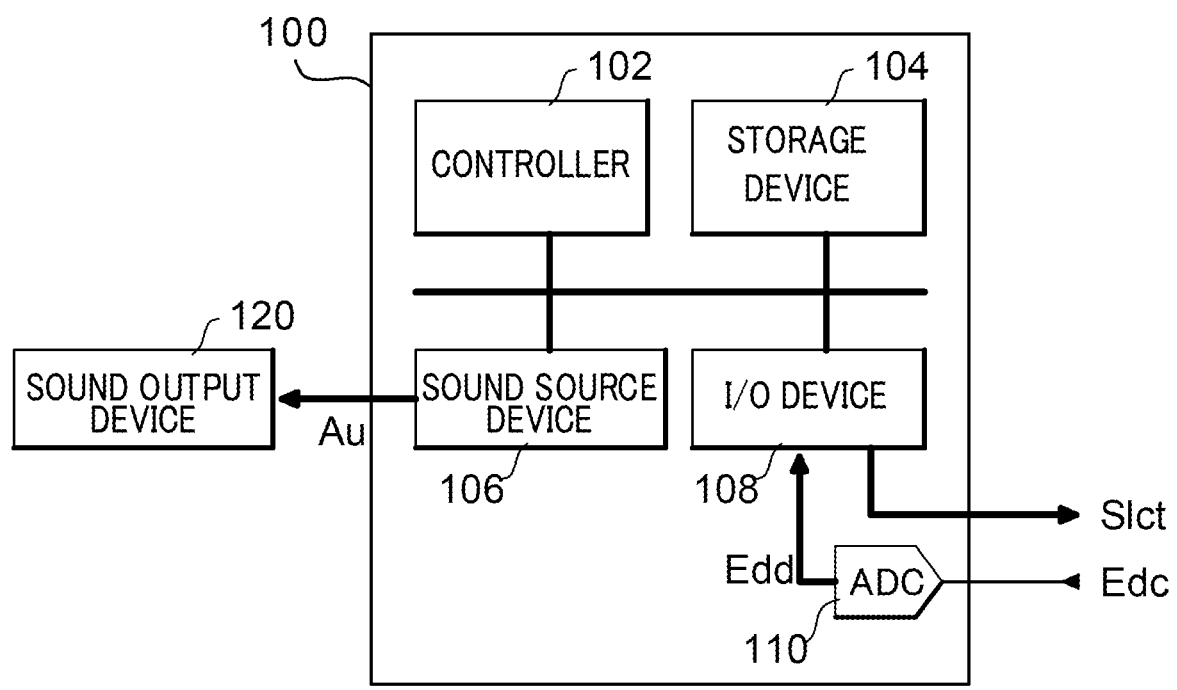
FIG. 6 is a block diagram showing a configuration of an information processor in the musical keyboard instrument.

FIG. 6 is a block diagram showing a configuration of the information processor 100. The information processor 100 includes a controller 102, a storage device 104, a sound source device 106, an input/output (I/O) device 108, and an analog-to-digital converter (ADC) 110.

The ADC 110 converts an analog signal Edc output from the rectifier-smoothing circuit 90 into a digital signal Edd. The I/O device 108 is a circuit for inputting and outputting signals. Specifically, the I/O device 108 supplies the signal Edd to the controller 102 when the signal is input. Also, the I/O device 108 outputs the control signal Slct, which is supplied from the controller 102.

The storage device 104 stores various data, programs, and the like in a non-volatile manner, and comprises a known recording medium, such as a magnetic recording medium or a semiconductor recording medium, for example. The storage device 104 may comprise a combination of multiple types of storage media. A portable recording medium detachable from the musical keyboard instrument 10, or an external recording medium (e.g., online file storage, cloud storage) with which the musical keyboard instrument 10 is communicable, may be used as the storage device 104.

The controller 102 obtains the displacement amount d of each key 12 by analyzing the signal Edd, and generates manipulation information for each key 12 based on the displacement amount d, for output to the sound source device 106. The manipulation information for each key 12 includes information indicative of the pitch of the key 12, information indicative of sounding or muting, and information indicative of the pressing velocity of the key 12. The sound source device 106 generates an audio signal Au based on the manipulation information output from the controller 102. Specifically, when the information indicating the pitch is supplied, the sound source device 106 generates an audio signal Au representative of a music sound of the pitch at a volume corresponding to the information indicating the key pressing velocity. When the information indicating the pitch is supplied together with the information indicating the muting, the sound source device 106 stops generating the audio signal Au of the music sound of the indicated pitch.

It is of note that the controller 102 may realize the function of the sound source device 106 by executing a program stored in the storage device 104.

A sound output device 120 is connected to the information processor 100, where necessary. The sound output device 120 outputs the sound represented by the audio signal Au. For example, a speaker or headphones are used as the sound output device 120. With supply of the audio signal Au from the sound source device 106 to the sound output device 120, the sound output device 120 outputs a sound corresponding to playing (pressing or releasing of the keys 12) by the user.

By way of the control signal Slct, the controller 102 specifies a pair of the demultiplexer 30 and multiplexer 40 in turn (for example in the order described below) and specifies the selection of an input and output of the specified pair of the demultiplexer 30 and multiplexer 40 in turn. Specifically, the controller 102 selects a pair of the demultiplexer 30 and the multiplexer 40 in order of the first pair, second pair, third pair, . . . , and then the eleventh pair, and repeats this selecting operation starting from the first pair. The controller 102 specifies the selection of the input/output of the demultiplexer 30 and the multiplexer 40 in the selected pair in the order of the input/output from 1, 2, 3, . . . , to 10.

Operation of the controller 102 will now be described. As described above, the voltage level $E_\infty$, used for the normalization can simply be obtained by using the first equivalent circuit 70. However, in the present embodiment, to enhance accuracy, the voltage level $E_\infty$, is obtained from the following voltage levels $E_{\infty 1}$, $E_{\infty 2}$, and $E_{\infty 3}$.

A state in which the distance Z is infinite is synonymous with a state in which the first resonant circuit 50 does not exist, as from the second resonant circuit 60. In this state, the gain of the second coil 601 in the measurement frequency fm will be 0 dB.

Accordingly, the voltage level $E_{\infty 1}$ of the second resonant circuit 60 as of the factory default is first obtained. Specifically, for a second resonant circuit 60, the level of the detection signal Eout (Edd) output from the output terminal T2 thereof when the reference signal Ein (in the measurement frequency fm) is supplied to the input terminal T1 thereof, is obtained as the voltage level $E_{\infty 1}$ of the second resonant circuit 60 of the factory default. To obtain the voltage level $E_{\infty 1}$ of the factory default, the reference signal Ein is supplied to the input terminal T1 of the second resonant circuit 60 before the second resonant circuit 60 is mounted to the supporting member 14, i.e., in a state in which the first resonant circuit 50 does not exist.

Second, the voltage level $E_{\infty2}$ in the initial state is obtained. For example, the reference signal Ein is supplied to the input terminal T1 of the first equivalent circuit 70 immediately after the power of the musical keyboard instrument 10 is turned on (initial state). The level of the detection signal Eout (Edd) output from the output terminal T2 of the first equivalent circuit 70 when the reference signal Ein is thus supplied is obtained as the voltage level $E_{\infty2}$ in the initial state.

Third, the voltage level $E_{\infty3}$ during playing is obtained. Specifically, in the musical keyboard instrument 10, the reference signal Ein is supplied to the input terminal T1 of the first equivalent circuit 70 during playing after the musical keyboard instrument 10 is turned on. The level of the detection signal Eout (Edd) output from the output terminal T2 of the first equivalent circuit 70 when the reference signal Ein is thus supplied is obtained as the voltage level $E_{\infty3}$ during playing.

The voltage level E∞ for use in the normalization process is obtained by the following Equation (2).

$$E\infty = E_{\infty1} + (E_{\infty3} - E_{\infty2}) \quad (2)$$

By using the voltage level E∞, obtained by Equation (2) in the normalization process, not only a variation of circuit characteristics upon energization but also a variation depending on each individual second resonant circuit 60 is taken into account. The voltage level $E_{\infty1}$ is a value specific to the second resonant circuit 60, and the voltage levels $E_{\infty2}$ and $E_{\infty3}$ are values measured in the first equivalent circuit 70, which is shared by the eight second resonant circuits 60. Of the voltage levels $E_{\infty1}$, $E_{\infty2}$, and $E_{\infty3}$, the voltage level $E_{\infty1}$ is measured for each second resonant circuit 60 of the factory default and stored in the storage device 104 in association with the corresponding second resonant circuit 60. The voltage level $E_{\infty2}$ is measured for each of the first equivalent circuits 70 in the initial state, and is stored in the storage device 104 in association with the first equivalent circuit 70. In the operation shown in the flowchart in FIG. 7, it is assumed that the voltage level $E_{\infty1}$ is stored in the storage device 104 for each of the 88 second resonant circuits 60, and the voltage level $E_{\infty2}$ is stored in the storage device 104 for each of the 11 first equivalent circuits 70.

Figure 7:
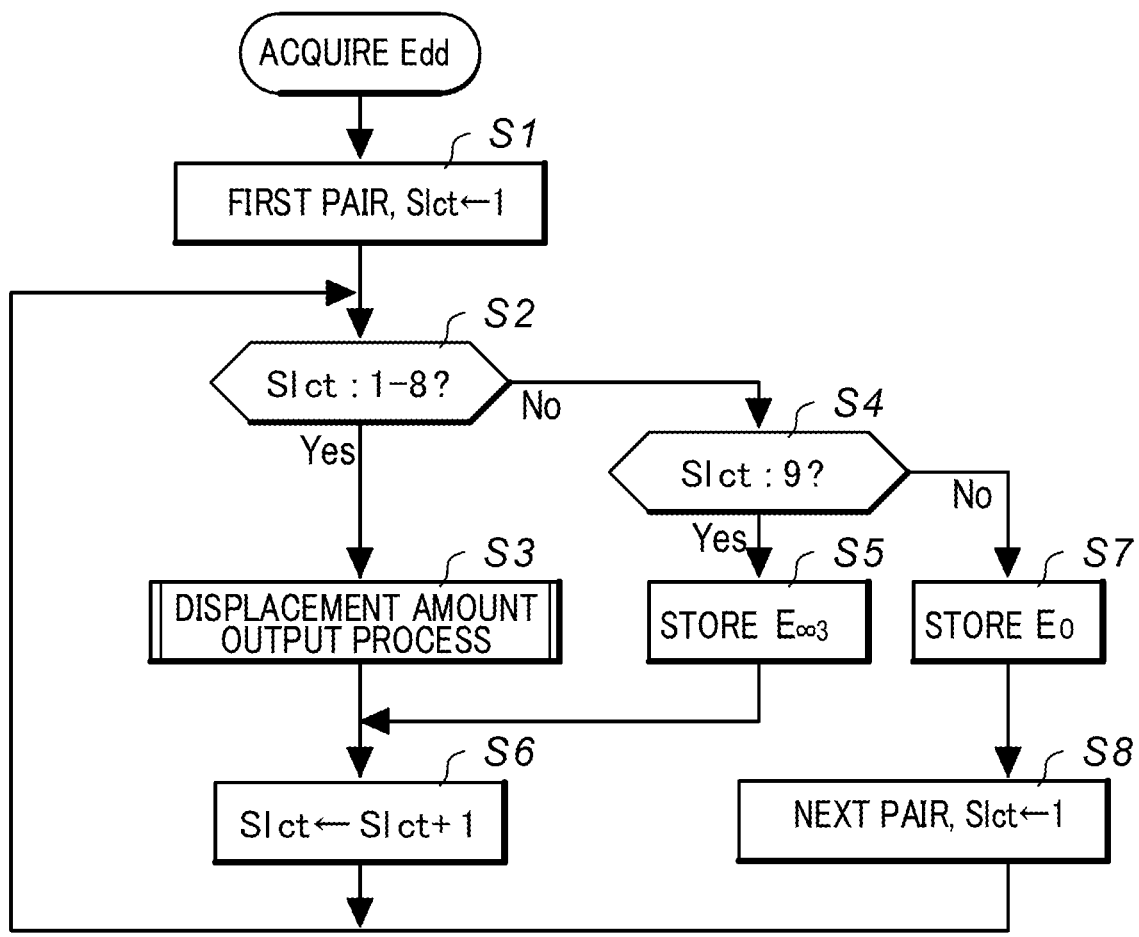
FIG. 7 is a flowchart showing an operation of the information processor.

FIG. 7 is a flowchart showing an operation of the controller 102. In this operation, the controller 102 specifies, by way of a signal Slct, a pair of the demultiplexer 30 and the multiplexer 40 in turn, and further specifies a selection of the input and output of the specified pair in turn. Accordingly, the controller 102, by way of the control signal Slct, specifies, as an initial target pair to be measured, the first pair of the demultiplexer 30 and the multiplexer 40 and specifies the selection of the input/output 1 of the first pair (Step S1).

Next, the controller 102 determines whether the control signal Slct indicates the selection of any of the inputs/outputs 1-8, among the inputs/outputs 1 to 10 of the first pair of the demultiplexer 30 and the multiplexer 40 (Step S2). If the control signal Slct specifies the selection of any of the inputs/outputs 1-8 (if the result of the determination at Step S2 is "Yes"), the controller 102 executes a process of outputting a displacement amount, etc. (hereafter, "displacement amount output process"), to thereby process the detection signal Eout of a second resonant circuit 60 that corresponds to the selected input/output (Step S3). In the displacement amount output process, the displacement amount d of a key 12 corresponding to a selected input/output of a selected pair of the demultiplexer 30 and the multiplexer 40 is obtained, and manipulation information based on the displacement amount d is output.

If the control signal Slct specifies selection of none of the inputs/outputs 1-8 (if the result of the determination at Step S3 is "No"), then the input/output 9 or 10 should be specified by the control signal Slct. The controller 102 then determines whether the input/output 9 is selected (Step S4).

If the selection of the input/output 9 is specified by the control signal Slct (if the result of the determination at Step S4 is "Yes"), the controller 102 acquires the detection signal Eout (an example of "first output signal") of the selected first equivalent circuit 70, to store the voltage level $E_{\infty3}$ obtained on the basis of the detection signal Eout in the storage device 104 in association with the selected pair of the demultiplexer 30 and the multiplexer 40 (Step S5). After completion of Step S3 or S5, the controller 103 increments the number of the input/output to be selected by the control signal Slct by "1," moving onto the next input/output to be measured (Step S6).

If the selection of the input/output 9 is not specified by the control signal Slct (if the result of the determination at Step S4 is "No"), then the input/output 10 should be specified. Therefore, the controller 102 acquires the detection signal Eout (an example of "second output signal") of the selected second equivalent circuit 80 according to the specified input/output 10, to store the voltage level $E_0$ obtained on the basis of the detection signal Eout in the storage device 104 in association with the selected pair (Step S7). At Step S7, the controller 102 may calculate an average of the voltage level $E_0$ associated with a certain pair and one or more voltage levels $E_0$ of the same pair stored in the past, and may store the average as the voltage level $E_0$ to be used for the normalization. After completion of Step S7, the controller 103 shifts the target pair to be measured to the next pair and resets the number of the input/output to be selected in that pair to "1" (Step S8).

After completion of Step S6 or S8, the controller 102 returns the processing procedure to Step S2. Thereafter, the operations at Step S2 through S8 are repeated until the power is turned off. In this way, the controller 102 obtains the displacement amount d for each of the 88 keys 12 and outputs the manipulation information based on the respective displacement amount d.

Figure 8:
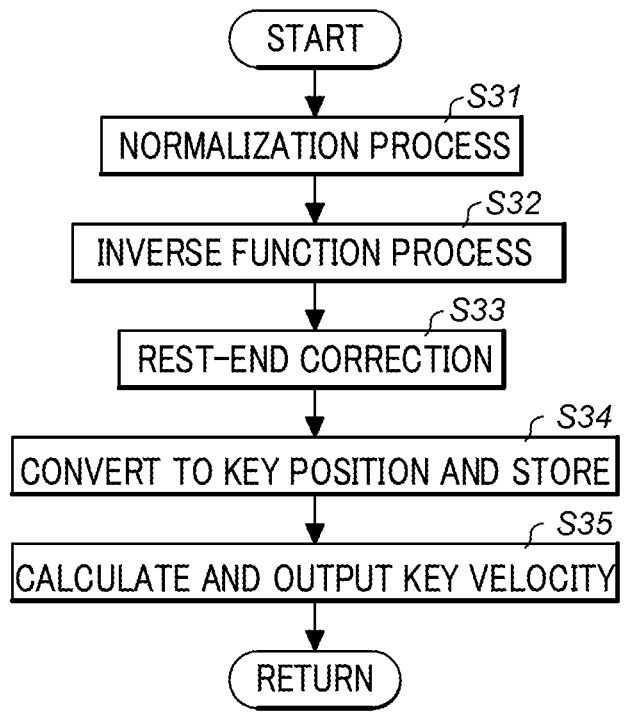
FIG. 8 is a flowchart showing an operation of the information processor.

FIG. 8 is a flowchart showing a detailed operation of the displacement amount output process of Step 3 described above. In the displacement amount output process, the controller 102 first executes a normalization process (Step S31). Specifically, the controller 102 reads, from the storage device 104, (i) the voltage level $E_{\infty1}$ associated with a second resonant circuit 60 that corresponds to (a) the pair of demultiplexer 30 and multiplexer 40 to be measured and (b) the input/output specified as the selection in the pair, and (ii) the voltage levels $E_{\infty2}$ and $E_{\infty3}$ associated with the pair, to calculate the voltage level $E_\infty$ according to Equation (2). The controller 102 also reads from the storage device 104 the voltage level $E_0$ associated with the pair to be measured. The controller 102 normalizes the voltage-and-displacement-amount characteristics of the pair to be measured, by using the calculated voltage level $E_\infty$, and the read-out voltage level $E_0$, to obtain normalized characteristics N.

Next, the controller 102 obtains an inverse function of the normalized characteristics N (Step S32). The controller 102 then executes the Rest-End correction described above for the second resonant circuit 60 to be measured (i.e., the key 12) (Step S33). Specifically, for the key 12 corresponding to the second resonant circuit 60 to be measured, the start point is corrected to a point at a distance Zrst of the key 12 and the end point to a point at a distance Zend of the key 12. In this manner, the normalization of the voltage-and-displacement-amount characteristics is performed by use of the voltage levels $E_\infty$ and $E_0$ used in common by 8 keys corresponding to the same pair, to obtain the inverse function of the normalized characteristics N. The Rest-End correction is performed for each key 12.

The controller 102 applies the Rest-End correction to the voltage level En corresponding to the second resonant circuit 60 to be measured. The Rest-End correction is performed based on the distances Zrst and Zend of a key 12 that corresponds to the second resonant circuit 60. The controller 120 then converts the corrected voltage level En into a distance Z through the inverse function, and further converts the distance Z into a displacement amount d to store the displacement amount d in association with the pitch of the key 12 (Step S34). The voltage level En corresponding to the second resonant circuit 60 is a voltage level obtained by normalizing a signal Edc by way of Equation (1). The signal Edc is obtained by rectifying and smoothing the detection signal Eout output from the output terminal T2 of the second resonant circuit 60.

In a case where the converted displacement amount d of the key 12 is not zero, i.e., the key 12 is manipulated by the user, the controller 102 obtains the pressing velocity of the key 12 by dividing the difference between the previously stored displacement amount d and the newly stored displacement amount d, by the sampling time (Step S35). The sampling time is the time interval at which the process of Step S3 is executed for the same key 12.

If the displacement amount d obtained at Step S34 indicates the down end position End, which indicates a timing for producing a sound, the controller 102 outputs the pressing velocity of the key obtained at Step S35 together with the information indicating the pitch of the key 12. As a result, the sound source device 106 generates an audio signal Au of a pitch corresponding to the key 12 at a volume corresponding to the key pressing velocity. It is of note that while it is assumed that a sound is produced on condition that a key has reached the down end position End, a position for producing a sound is not limited thereto. The sound may be produced at any desired position during a key stroke. If the displacement amount d stored at a previous time is not zero and the displacement amount d stored at a present time is the rest position Rst, which indicates a timing to mute the sound, the controller 102 outputs the information indicating the sound mute together with the information indicating the pitch of the key 12. The sound source device 106 then stops generating an audio signal Au corresponding to the indicated pitch of the key 12.

After Step S35, the controller 102 ends the displacement amount output process, and returns the processing procedure to Step S6.

Figure 9:
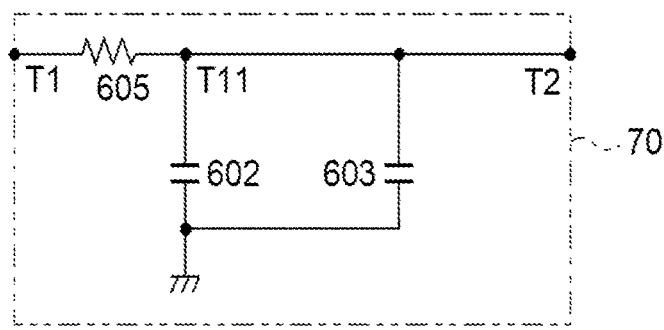
FIG. 9 is a diagram showing an example of a first equivalent circuit.

Description will be now given of the first equivalent circuit 70, which simulates the circuit characteristics of the second resonant circuit 60 in a state that the distance Z is infinite. In the state that the distance Z is infinite, the first resonant circuit 50 is in a state as if the first resonant circuit 50 does not exist as from the second resonant circuit 60. In other words, the coupling coefficient between the first coil 501 and the second coil 601 is "0." As described above, in the present embodiment, the resonant frequency fa in the second resonant circuit 60 is set to have a value of $1/(\sqrt{2})$ times the measurement frequency fm, and in the state that the coupling coefficient is "0," the gain of the second coil 601 at the measurement frequency fm is 0 dB. Accordingly, the first equivalent circuit 70 can be configured such that the portion corresponding to the second coil 601 in the second resonant circuit 60 is short-circuited, as shown in FIG. 9. In the state that the distance Z is infinite, the gain from the input terminal T1 to the output terminal T2 is "1" at the measurement frequency fm. The first equivalent circuit 70 can be configured such that the input terminal T1 is directly coupled to the output terminal T2; namely, the output 9 of the demultiplexer 30 in each pair is directly coupled to the input 9 of the multiplexer 40.

Description will next be given of the second equivalent circuit 80, which simulates the circuit characteristics of the second resonant circuit 60 in a state that the distance Z is zero. In the state that the distance Z is zero, the coupling coefficient is "1." Such a state, however, cannot be physically reproduced. Accordingly, the second equivalent circuit 80 can be configured such that the second coil 601 for which the coupling coefficient is "1" at the above measurement frequency fm is replaced by other elements in accordance with the following procedure.

Figure 10:
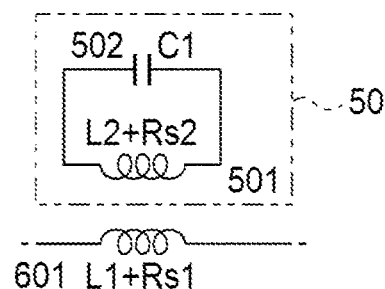
FIG. 10 is an explanatory diagram of a second equivalent circuit.
Figure 11:
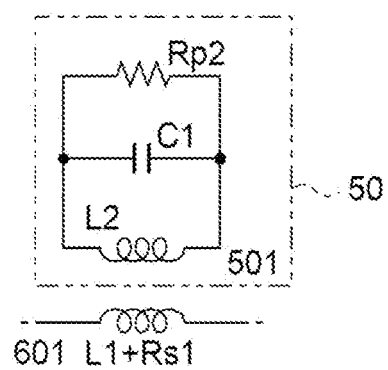
FIG. 11 is an explanatory diagram of the second equivalent circuit.

As shown in FIG. 10, it is assumed that the inductance component in the first coil 501 is L2 and the resistive component in the first coil 501 is Rs2. Also, the capacitance of the capacitor 502 is C1. The resistive component Rs2 is replaced by a parallel resistor Rp2, as shown in FIG. 11. Here, $Rp2=(\omega L2)^2/Rs2$, where $\omega$ is an angular frequency obtained by multiplying the measurement frequency fm by $2\pi$. The inductance component in the second coil 601 is L1, and the resistive component is Rs1.

Figure 12:
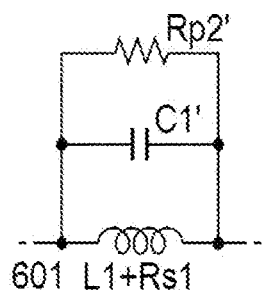
FIG. 12 is an explanatory diagram of the second equivalent circuit.

The impedance of the first resonant circuit 50 is (L1/L2) relative from the second coil 601. Accordingly, as shown in FIG. 12, the impedance of the first resonant circuit 50 is transformed and added in parallel to the second coil 601. Specifically, a resistor Rp2' and a capacitor C1' are coupled in parallel to the second coil 601. Rp2' and C1' are represented as follows.

$$Rp2'=(L1/L2) \cdot Rp2$$

$$1/(\omega C1')=(L1/L2) \cdot (1/(\omega C1))$$

Figure 13:
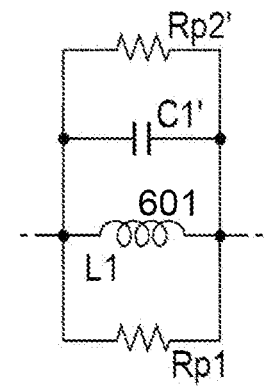
FIG. 13 is an explanatory diagram of the second equivalent circuit.

As shown in FIG. 13, the resistive component Rs1 of the second coil 601 is replaced by a resistor Rp1 coupled in parallel. Here, $Rp1=(\omega L1)^2/Rs1$. If the measurement frequency fm is at a resonant frequency, the impedances of the inductance L1 and the capacitor C1' will be infinite. Therefore, the inductance L1 and capacitor C1' can be treated as if they did not exist as depicted by the dashed line in FIG. 14.

However, the inductance L1 and the capacitor C1' can be treated as non-existent only when the measurement frequency fm corresponds to the resonant frequency. The actual reference signal Ein has a DC voltage superimposed thereon. Since the inductance L1 is equivalent to non-existent only in relation to the DC component, an element to reduce the DC impedance is required in the parallel circuit of the resistors Rp1 and Rp2' shown in FIG. 14. A third coil 611 with an inductance L3 serves as such an element, as shown in FIG. 15.

Figure 14:
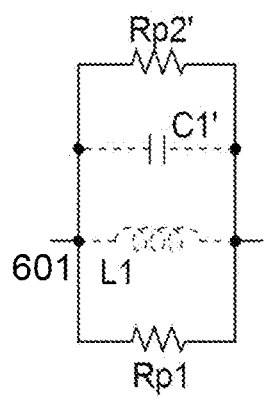
FIG. 14 is an explanatory diagram of the second equivalent circuit.
Figure 15:
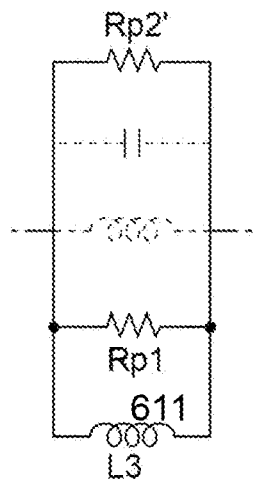
FIG. 15 is an explanatory diagram of the second equivalent circuit.
Figure 16:
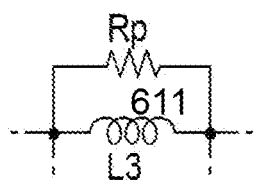
FIG. 16 is an explanatory diagram of the second equivalent circuit.
Figure 17:
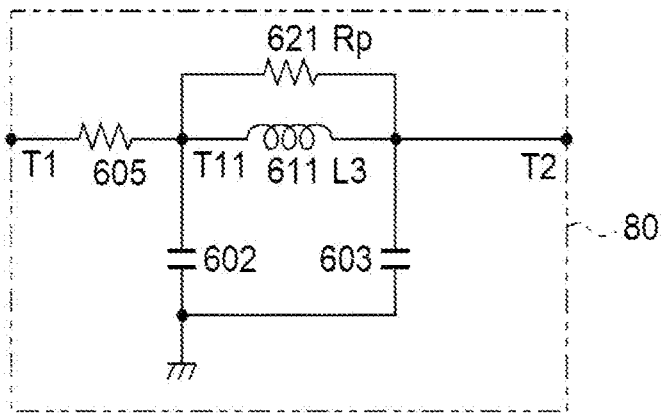
FIG. 17 is a diagram showing an example of the second equivalent circuit.

As shown in FIG. 16, the resistors Rp1 and Rp2' in FIG. 14 or FIG. 15 are represented by a single resistor Rp, and the third coil 611 is coupled to the resistor Rp in parallel. FIG. 17 shows the second equivalent circuit 80 with the first coil 501 replaced in the manner described above. In the second equivalent circuit 80, it is required that at the resonant frequency the resistor Rp have an impedance depending on the resistors Rp1 and Rp2, and that the impedance be zero (or close to zero) when the DC component is passed therethrough.

The cutoff frequency fc, relative to the measurement frequency fm, is determined by L3 and Rp by the following equation.

$$fm >> fc = 1/(2\pi \cdot L3 \cdot Rp)$$

In other words, L3 is selected to satisfy the above equation, relative to the measurement frequency fm. A large inductor is required for the third coil 611 to reduce the impedance of DC. For this purpose, the third coil 611 is realized by, for example, connecting multiple large-capacity multilayer chip inductors in series.

Figure 18:
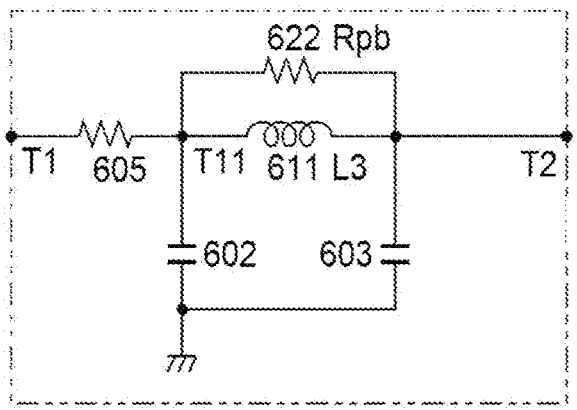
FIG. 18 is a diagram showing another example of the second equivalent circuit.

The first equivalent circuit 70 simulates the circuit characteristics of the second resonant circuit 60 with the coupling coefficient at "0," and the second equivalent circuit 80 simulates the circuit characteristics of the second resonant circuit 60 with the coupling coefficient at "1." The equivalent circuit may simulate circuit characteristics of the second resonant circuit 60 in states other than a state in which the coupling coefficient is "0" or "1." Specifically, the impedance at the measurement frequency fm may be calculated by simulation, etc., at a desired coupling coefficient, and the calculated impedance may be represented in the form of resistor in such an equivalent circuit. For example, the equivalent circuit with a coupling coefficient having a certain value is shown in FIG. 18. As shown, the resistor Rp connected in parallel to the third coil 611 is replaced by a resistor Rpb having the resistive value obtained by the simulation, etc.

As will be understood from the above description, the equivalent circuit is not limited to the state where the distance between the first coil 501 and the second coil 601 is infinite or zero, but may also simulate characteristics of the second resonant circuit 60 in other states. In other words, a first equivalent circuit that is equivalent to the second resonant circuit when the second resonant circuit is in a state such that a distance between the first coil and the second coil takes a first value may be employed, and the controller may correct a detection signal based on a first output signal output from the first equivalent circuit. Furthermore, a second equivalent circuit that is equivalent to the second resonant circuit when the second resonant circuit is in a state such that the distance between the first coil and the second coil takes a second value different from the first value may be employed in addition to the first equivalent circuit, and the controller may correct a detection signal based on both the first output signal and the second output signal output from the second equivalent circuit. Here, "a state in which a distance between the first coil and the second coil takes a first value" may be a state in which the distance is one of infinite, zero, or any intermediate value therebetween. Likewise, "a state in which the distance takes a second value different from the first value" may be a state in which the distance is one of infinite, zero, or any intermediate value therebetween, with the second value being different from the first value.

Following are examples of specific variations added to each of the above-exemplified modes. Two or more modes freely selected from the following examples may be combined as appropriate so long as they do not contradict each other.

In the above-described embodiment, the controller 102 stores the voltage level $E_{\infty 3}$ obtained at Step S5 and reads it out at Step S31, for use in the normalization process, but an average value of the voltage level $E_{\infty 3}$ obtained at Step S5 (for example, an average value of 10 voltage levels $E_{\infty 3}$) may be calculated and used in the normalization process. Furthermore, in the embodiment described above, the voltage level $E_\infty$ used for normalization is obtained by Equation (2), but the voltage level $E_\infty$ obtained by the first equivalent circuit 70 in the playing state may be used for the normalization.

In the embodiment described above, a pair of the first equivalent circuit 70 and the second equivalent circuit 80 is provided for each of the plurality of pairs of the demultiplexers 30 and the multiplexers 40, i.e., for every eight pairs of the first resonant circuits 50 and the second resonant circuits 60, but a pair of the first equivalent circuit 70 and the second equivalent circuit 80 may be provided for every two or more pairs of the plurality of the pairs of demultiplexers 30 and the multiplexers 40. According to this configuration, it is possible to reduce the number of pairs of the first equivalent circuits 70 and the second equivalent circuits 80. Furthermore, a single pair of the first equivalent circuit 70 and the second equivalent circuit 80 may be provided for a single pair of the first resonant circuit 50 and the second resonant circuit 60. According to this configuration, since the first equivalent circuit 70 and the second equivalent circuit 80 are not shared by other pairs of the first resonant circuits 50 and the second resonant circuits 60, it is possible to improve accuracy in detecting the displacement amount d.

In the embodiment described above, the displacement of a key 12 of the musical keyboard instrument 10 is detected. However, a movable member for which displacement amount is detected is not limited to a key 12. The keyboard structure is also not limited to that described in the above embodiment. The following are specific examples of movable members that differ from the above example.

Figure 19:
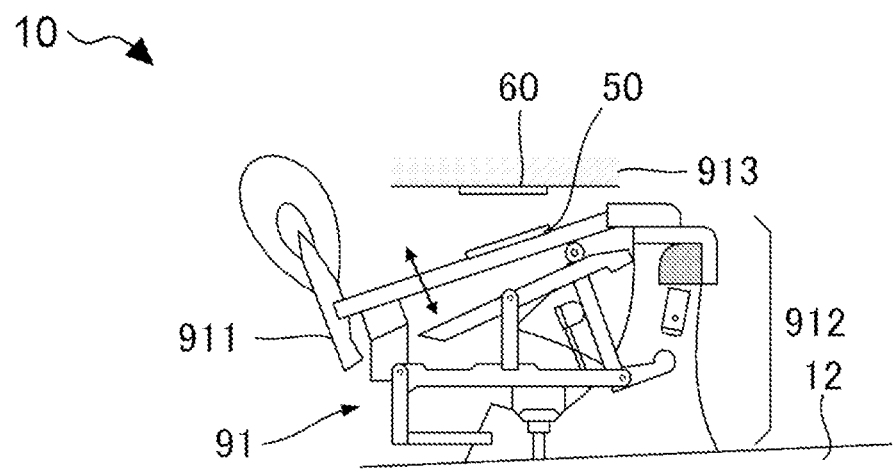
FIG. 19 shows an example of applying the displacement amount detection apparatus to a strike mechanism of a musical keyboard instrument.

FIG. 19 is a schematic diagram of a configuration in which the displacement amount detection apparatus is applied to a strike mechanism 91 of the musical keyboard instrument 10. The strike mechanism 91 is an action mechanism that strikes a string (not shown) in conjunction with a displacement of each key. Specifically, the strike mechanism 91 includes, for each key, a hammer 911 capable of striking a string by rotation and a transmission mechanism 912 (e.g., a whippen, jack, repetition lever, etc.) that causes the hammer 911 to rotate in conjunction with the displacement of the key. The first resonant circuit 50 is mounted to the hammer 911 (e.g., at a hammer shank). The second resonant circuit 60 is mounted to the supporting member 913. The supporting member 913 is a structure configured to support, for example, the strike mechanism 91. In this configuration, the information processor 100 (not shown) obtains the displacement amount of the hammer 911. The first resonant circuit 50 may be mounted to a movable member other than the hammer 911 in the strike mechanism 91.

Figure 20:
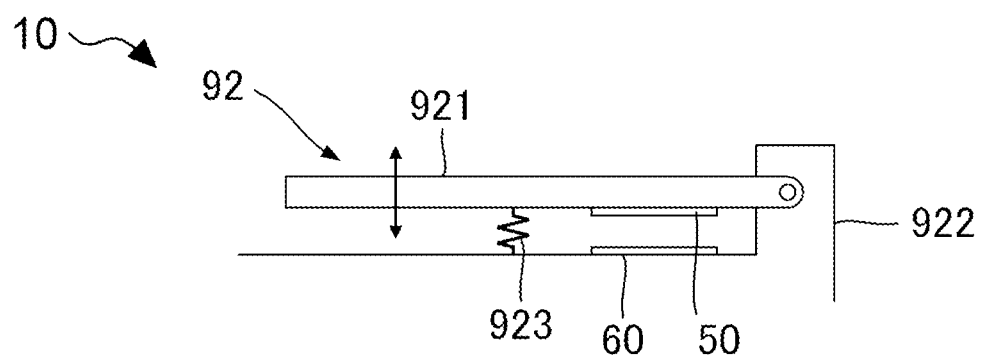
FIG. 20 is an example of applying the displacement amount detection apparatus to a pedal mechanism of a musical keyboard instrument.

FIG. 20 is a schematic diagram of a configuration in which the displacement amount detection apparatus is applied to a pedal mechanism 92 of the musical keyboard instrument 10. The pedal mechanism 92 includes a pedal 921 manipulated by a user's foot, a supporting member 922 that supports the pedal 921, an elastic body 923 that urges the pedal 921 in an upward vertical direction. The first resonant circuit 50 is mounted to the underside of the pedal 921. The second resonant circuit 60 is mounted to the supporting member 922 in opposing relation to the first resonant circuit 50. In this configuration, the information processor 100 detects the displacement of the pedal 921. A musical instrument for which the pedal mechanism 92 is used is not limited to a musical keyboard instrument. For example, the pedal mechanism 92 of the same configuration may be used in a freely selected musical instrument, such as a percussion instrument, etc.

As will be understood from the above examples, an object for which the displacement amount is detected is comprehensively represented as a movable member that is displaced in response to a playing operation. The movable member includes a manipulator, such as the keys 12 or the pedal 921, directly manipulated by a user, and also includes a structure such as the hammer 911 that is displaced in conjunction with a user manipulation of a manipulator.

However, the movable member according to the present disclosure is not limited to a member that is displaced in response to a playing operation. That is, the movable member should be understood as a displaceable member regardless of how displacement takes place.

APPENDIX

The following configurations are derivable from the different embodiments described above.

A displacement amount detection apparatus according to an aspect (first aspect) of the present disclosure includes (i) a first resonant circuit that includes a first coil mounted to a movable member; (ii) a second resonant circuit that includes a second coil that generates a magnetic field upon supply of an electric current and is configured to output a detection signal of a voltage level depending on a relative position of the second coil with respect to a position of the first coil, the second coil facing the first coil; and (iii) a pair of first and second equivalent circuits. The first equivalent circuit is equivalent to the second resonant circuit in a case where the second resonant circuit is in a state in which a distance between the first coil and the second coil is infinite; and the second equivalent circuit is equivalent to the second resonant circuit in a case where the second resonant circuit is in a state in which the distance between the first coil and the second coil is zero. The displacement amount detection apparatus further includes a processor configured to: acquire a first output signal output from the first equivalent circuit when the electric current is supplied to the first equivalent circuit; acquire a second output signal output from the second equivalent circuit when the electric current is supplied to the second equivalent circuit; correct the detection signal based on the first output signal and the second output signal; and calculate, based on the corrected detection signal, a displacement amount of the movable member.

According to this aspect, the manipulation information of a movable member can be obtained based on a voltage level of a detection signal that corresponds to a degree of electromagnetic coupling between first and second coils, and thus need for a delicate optical element such as a gray scale is obviated. As a result, it is possible to achieve long-term reliability. Furthermore, in this aspect, a first output signal output from the first equivalent circuit may be regarded as a detection signal output from a second resonant circuit in a case that the distance is infinite, and a second output signal output from the second equivalent circuit may be regarded as a detection signal output from a second resonant circuit in a case that the distance is zero. Therefore, even if it is not possible to physically create, for the second resonant circuit, a state in which the distance between the first and second coils is infinite and zero after the first resonant circuit is mounted to a movable member that moves relative to the second resonant circuit, it is possible normalize a relationship for the distance between the first and second coils and the level of the detection signal. Accordingly, it is possible to calculate a displacement amount of a movable member with reduced error. The output of the detection signal to an information processor may include outputting the detection signal via a converter that converts the signal.

According to an example (second aspect) of the first aspect, the movable member is one of a plurality of movable members; the first resonant circuit is one of a plurality of first resonant circuits, each of the plurality of first resonant circuits including a first coil, the second resonant circuit is one of a plurality of second resonant circuits, each of the plurality of second resonant circuits including a second coil facing a respective first coil, each of the plurality of first resonant circuits is mounted to a respective movable member, each of the plurality of second resonant circuits is provided corresponding to a respective first resonant circuit, and is configured to output a detection signal, and the processor is further configured to correct a respective detection signal based on the first output signal and the second output signal, and calculate the displacement amount of the corresponding movable member based on the respective corrected detection signal.

According to this aspect, it is possible to calculate displacement amounts of a plurality of movable members with reduced error.

A displacement amount detection apparatus according to an example (third aspect) of the second aspect of the present disclosure further includes at least one pair of a demultiplexer and a multiplexer. The demultiplexer is configured to supply the electric current to the plurality of second resonant circuits by time division, and the multiplexer is configured to output, to the processor, the respective detection signal from each of the plurality of second resonant circuits to which the electric current has been supplied, and a pair of the first equivalent circuit and the second equivalent circuit is provided for each pair of the at least one pair of the demultiplexer and the multiplexer.

According to this configuration, compared to a configuration in which a pair of the first and the second equivalent circuits is provided for each pair of at least one pair of the demultiplexers and the multiplexers, it is possible to improve accuracy in detecting the displacement amount.

The displacement amount detection apparatus according to an example (fourth aspect) of the second aspect of the present disclosure further includes a plurality of pairs of demultiplexers and multiplexers, each of the demultiplexers being configured to supply the electric current to the plurality of second resonant circuits by time division, and each of the multiplexers being configured to output, to the processor, the respective detection signal from each of the plurality of second resonant circuits to which the electric current has been supplied, and a pair of the first equivalent circuit and the second equivalent circuit is provided for every two or more pairs of the plurality of pairs of the demultiplexers and the multiplexers.

According to this aspect, since a pair of the first and second equivalent circuits is shared by multiple pairs of the demultiplexers and multiplexers, the configuration can be simplified as compared to a configuration in which a pair of the first and the second equivalent circuits is provided for each pair of the demultiplexer and multiplexer.

The displacement amount detection apparatus according to an example (fifth aspect) of the third or the fourth aspect of the present disclosure further includes a rectifier-smoothing circuit configured to rectify and smooth the respective detection signals output from the multiplexer.

According to this aspect, the processor is able to process a detection signal in direct current.

The displacement amount detection apparatus according to the first aspect can also be conceived of as a method (sixth aspect). Such a method is a displacement amount detection method of detecting a displacement amount of a movable member using a displacement apparatus that includes: (i) a first resonant circuit that includes a first coil mounted to the movable member; (ii) a second resonant circuit that includes a second coil that generates a magnetic field upon supply of an electric current and is configured to output a detection signal of a voltage level depending on a relative position of the second coil with respect to a position of the first coil, the second coil facing the first coil; and (iii) a pair of first and second equivalent circuits, the first equivalent circuit being equivalent to the second resonant circuit in a case where the second resonant circuit is in a state in which a distance between the first coil and the second coil is infinite; and the second equivalent circuit being equivalent to the second resonant circuit in a case where the second resonant circuit is in a state in which the distance between the first coil and the second coil is zero. The method includes: acquiring a first output signal output from the first equivalent circuit when the electric current is supplied to the first equivalent circuit; acquiring a second output signal output from the second equivalent circuit when the electric current is supplied to the second equivalent circuit; correcting the detection signal based on the first output signal and the second output signal; and calculating the displacement amount based on the corrected detection signal.

A manipulation information output apparatus according to a seventh aspect of the present disclosure includes: a manipulator; a first resonant circuit that includes a first coil mounted to the manipulator; a second resonant circuit that includes a second coil that generates a magnetic field upon supply of an electric current and is configured to output a detection signal of a voltage level depending on a relative position of the second coil with respect to a position of the first coil, the second coil facing the first coil; a first equivalent circuit equivalent to the second resonant circuit in a case where the second resonant circuit is in a state in which a distance between the first coil and the second coil takes a first value; and a processor configured to: correct the detection signal based on a first output signal output from the first equivalent circuit upon the electric current being supplied to the first equivalent circuit, and output, based on the corrected detection signal, manipulation information of the manipulator.

According to this aspect, similarly to the first aspect, need for delicate optical elements such as grayscale is obviated. Accordingly, long-term reliability can be obtained.

The manipulation information output apparatus according to an example (eighth aspect) of the seventh aspect, further includes a second equivalent circuit equivalent to the second resonant circuit in a case where the second resonant circuit is in a state in which the distance between the first coil and the second coil takes a second value different from the first value, and the processor is further configured to correct the detection signal based on the first output signal and a second output signal output from the second equivalent circuit upon the electric current being supplied to the second equivalent circuit.

DESCRIPTION OF THE REFERENCE SIGNS

10 . . . musical keyboard instrument (manipulation information output apparatus), 12 . . . key (manipulator, movable member), 30 . . . demultiplexer, 40 . . . multiplexer, 50 . . . first resonant circuit, 60 . . . second resonant circuit, 70 . . . first equivalent circuit, 80 . . . second equivalent circuit, 90 . . . rectifier-smoothing circuit, 100 . . . information processor (processor)

What is claimed:
1. A displacement amount detection apparatus comprising:
 a first resonant circuit that includes a first coil mounted to a movable member;
 a second resonant circuit that includes a second coil that generates a magnetic field upon supply of an electric current and is configured to, in a case where the first resonant circuit is mounted opposite the second resonant circuit, output a first signal of a voltage level depending on a relative position of the second coil with respect to a position of the first coil, wherein the second coil faces the first coil in the case where the first resonant circuit is mounted opposite the second resonant circuit;
 a third circuit that does not include a coil and is configured to output a second signal defining a maximum value for the voltage level output from the second resonant circuit;
 a fourth circuit that includes a resistor coupled in parallel to a third coil and is configured to output a third signal defining a minimum value for the voltage level output from the second resonant circuit; and
 a processor configured to:
  acquire the second signal output from the third circuit when the electric current is supplied to the third circuit;
  acquire the third signal output from the fourth circuit when the electric current is supplied to the fourth circuit;
  correct the first signal based on the second signal and the third signal; and
  calculate, based on the corrected first signal, a displacement amount of the movable member.

2. The displacement amount detection apparatus according to claim 1, wherein:
 the movable member is one of a plurality of movable members;
 the first resonant circuit is one of a plurality of first resonant circuits, each of the plurality of first resonant circuits including a first coil,
 the second resonant circuit is one of a plurality of second resonant circuits, each of the plurality of second resonant circuits including a second coil facing a respective one of the first coils,
 each of the plurality of first resonant circuits is mounted to a respective one of the plurality of movable members,
 each of the plurality of second resonant circuits is provided corresponding to a respective first resonant circuit, and is configured to output a first signal, and
 the processor is further configured to correct a respective one of the first signals based on the second signal and the third signal, and calculate the displacement amount of a corresponding one of the plurality of movable members based on the respective corrected first signal.

3. The displacement amount detection apparatus according to claim 2, further comprising at least one pair of a demultiplexer and a multiplexer, wherein:
 the demultiplexer is configured to supply the electric current to the plurality of second resonant circuits by time division, and the multiplexer is configured to output, to the processor, the respective first signal from each of the plurality of second resonant circuits to which the electric current has been supplied, and a pair of the third circuit and the fourth circuit is provided for each pair of the at least one pair of the demultiplexer and the multiplexer.

4. The displacement amount detection apparatus according to claim 3, further comprising a rectifier-smoothing circuit configured to rectify and smooth the respective first signals output from the multiplexer.

5. The displacement amount detection apparatus according to claim 2, further comprising a plurality of pairs of demultiplexers and multiplexers, wherein:

each of the demultiplexers is configured to supply the electric current to the plurality of second resonant circuits by time division, and each of the multiplexers is configured to output, to the processor, the respective first signal from each of the plurality of second resonant circuits to which the electric current has been supplied, and a pair of the third circuit and the fourth circuit is provided for every two or more pairs of the plurality of pairs of the demultiplexers and the multiplexers.

6. The displacement amount detection apparatus according to claim 5, further comprising a rectifier-smoothing circuit configured to rectify and smooth the respective first signals output from each of the multiplexers.

7. A displacement amount detection method of detecting a displacement amount of a movable member using a displacement apparatus comprising:

a first resonant circuit that includes a first coil mounted to the movable member;

a second resonant circuit that includes a second coil that generates a magnetic field upon supply of an electric current and is configured to, in a case where the first resonant circuit is mounted opposite the second resonant circuit, output a first signal of a voltage level depending on a relative position of the second coil with respect to a position of the first coil, wherein the second coil faces the first coil in the case where the first resonant circuit is mounted opposite the second resonant circuit;

a third circuit that does not include a coil and is configured to output a second signal defining a maximum value for the voltage level output from the second resonant circuit; and a fourth circuit that includes a resistor coupled in parallel to a third coil and is configured to output a third signal defining a minimum value for the voltage level output from the second resonant circuit, the method comprising:

acquiring the second signal output from the third circuit when the electric current is supplied to the third circuit;

acquiring the third signal output from the fourth circuit when the electric current is supplied to the fourth circuit;

correcting the first signal based on the second signal and the third signal; and calculating the displacement amount based on the corrected first signal.

* * * * *